US012621503B2

(12) United States Patent
Keskikangas et al.

(10) Patent No.: US 12,621,503 B2
(45) Date of Patent: May 5, 2026

(54) METHOD OF PROCESSING DIGITAL VIDEO DATA AND IMAGE CAPTURING DEVICE

(71) Applicant: Axis AB, Lund (SE)

(72) Inventors: Axel Keskikangas, Lund (SE); Viktor Edpalm, Lund (SE)

(73) Assignee: AXIS AB, Lund (SE)

( * ) Notice: Subject to any disclaimer, the term of this patent is extended or adjusted under 35 U.S.C. 154(b) by 6 days.

(21) Appl. No.: 18/734,460

(22) Filed: Jun. 5, 2024

(65) Prior Publication Data

US 2024/0422362 A1    Dec. 19, 2024

(30) Foreign Application Priority Data

Jun. 14, 2023    (EP) ..................................... 23179282

(51) Int. Cl.
| *H04N 19/91* | (2014.01) |
| *H04N 19/156* | (2014.01) |
| *H04N 19/70* | (2014.01) |

(52) U.S. Cl.
CPC ........... *H04N 19/91* (2014.11); *H04N 19/156* (2014.11); *H04N 19/70* (2014.11)

(58) Field of Classification Search
CPC ....... H04N 19/91; H04N 19/156; H04N 19/70
See application file for complete search history.

(56) References Cited

U.S. PATENT DOCUMENTS

| 5,724,475 A | * | 3/1998 | Kirsten | ................ | H04N 19/137 |
| | | | | | 348/E7.086 |
| 10,687,062 B1 | | 6/2020 | Ramaswamy | | |

| 10,701,371 B1 | * | 6/2020 | Boll | ........................ | H04N 19/59 |
| 11,206,415 B1 | * | 12/2021 | Leontaris | ............... | H04N 19/40 |
| 2013/0266076 A1 | * | 10/2013 | Wang | ..................... | H04N 19/44 |
| | | | | | 375/240.25 |
| 2015/0078433 A1 | * | 3/2015 | Pearlstein | ............ | H04N 19/132 |
| | | | | | 375/240.02 |
| 2016/0307596 A1 | * | 10/2016 | Hardin | ........... | H04N 21/440218 |
| 2017/0048482 A1 | * | 2/2017 | Drako | .................... | H04N 19/61 |
| 2018/0091827 A1 | * | 3/2018 | Chou | ................... | H04N 19/174 |
| 2019/0042856 A1 | * | 2/2019 | Drako | .................... | H04N 19/91 |
| 2019/0200046 A1 | * | 6/2019 | Lucas | ................. | H04N 19/176 |
| 2021/0400272 A1 | | 12/2021 | Jannard et al. | | |
| 2022/0053125 A1 | * | 2/2022 | Pihl | ........................ | H04N 19/17 |

(Continued)

FOREIGN PATENT DOCUMENTS

CN            203455038        *    9/2013

OTHER PUBLICATIONS

Dong, Jie translation of CN 203455038 Sep. 2, 2013 (Year: 2013).*

*Primary Examiner* — Zaihan Jiang
(74) *Attorney, Agent, or Firm* — Volpe Koenig

(57)            ABSTRACT

A method of processing digital video data comprises continuously capturing digital video data representing image frames. While capturing the digital video data, the digital video data is encoded into a sequence of encoded image frames, the sequence comprising key frames and delta frames, and storing the sequence of encoded image frames. It is then determined that the stored sequence of encoded image frames is to be entropy coded and, as a consequence, entropy coding the sequence of encoded image frames into an entropy coded sequence of image frames and storing the entropy coded sequence of image frames.

18 Claims, 2 Drawing Sheets

(56) References Cited

U.S. PATENT DOCUMENTS

| | | | |
|---|---|---|---|
| 2022/0116625 A1* | 4/2022 | Pihl | H04N 5/77 |
| 2022/0124339 A1* | 4/2022 | Pihl | H04N 19/59 |
| 2022/0286621 A1 | 9/2022 | Keskikangas et al. | |

* cited by examiner

METHOD OF PROCESSING DIGITAL VIDEO DATA AND IMAGE CAPTURING DEVICE

FIELD OF INVENTION

The present disclosure relates to processing of digital video data representing a captured sequence of image frames and an image capturing device comprising circuitry configured to perform such processing.

TECHNICAL BACKGROUND

A trend in the development of image capturing devices capable of capturing video data, i.e. cameras, is a demand for high image resolution and high image quality in terms of, e.g., dynamical range and high quality of colour representation while at the same time minimizing the amount of data required to represent such high image quality. In order to meet such demands, various algorithms have been developed during the last decades, each generation of algorithms being more complex than the previous generation. Consequently, there has been a continuous increase in the demand for higher and higher processing power of the cameras. The development of image capturing devices is therefore faced with the inevitable problem of compromising between high quality and the amount of energy available for powering the cameras, noting that most types of cameras are battery powered.

SUMMARY

It is of interest to provide a method that overcomes drawbacks as discussed above. This and other objects are achieved in a first aspect by providing a method having the features of the appended independent claim. Preferred embodiments are defined in the appended dependent claims.

Hence, according to a first aspect there is provided a method of processing digital video data. The method comprises continuously capturing digital video data representing image frames. While capturing the digital video data, the digital video data is encoded into a sequence of encoded image frames, the sequence comprising key frames and delta frames, and storing the sequence of encoded image frames. It is then determined that the stored sequence of encoded image frames is to be entropy coded and, as a consequence, entropy coding the sequence of encoded image frames into an entropy coded sequence of image frames and storing the entropy coded sequence of image frames.

The encoding of the digital video data into a sequence of encoded image frames may be performed by an encoder operating according to any of H.264 as specified by the International Telecommunication Union Telecommunication Standardization Sector (ITU-T), H.265 as specified by the ITU-T, Advanced Video Coding (AVC) as specified by the International Organization for Standardization and the International Electrotechnical Commission joint technical committee (ISO/IEC JTC 1) High Efficiency Video Coding (HEVC) as specified by the ISO/IEC JTC 1 and AOMedia Video 1 (AV1), as specified by the Alliance for Open Media (AOMedia).

By introducing the step of determining that the stored sequence of encoded image frames is to be entropy coded, the generation of the sequence of encoded image frames and the entropy coding, i.e. compression, of the sequence of encoded image frames can be separated in time. Such time can be minutes, hours or even days. This allows a device in which the method is performed to reduce the use of processing power while operating under a restricted power budget. Such a restricted power budge may for example be used while running on battery power or when the battery power is below a threshold, e.g. less than 20%. The reduction of power usage originates from that the present method makes it possible to postpone power demanding entropy encoding to a later point in time. For example, entropy encoding can be by postponing until the device is under no power usage restriction any more, e.g. when being powered by an external power source. Hence, introducing the postponement of the entropy encoding facilitates to maximize the time of operation for the capturing of video data and the encoding of the captured video data into a sequence of encoded image frames. This since battery power may be saved by not performing the entropy encoding when the device is operating under the restricted power budget.

The determining that the stored sequence of encoded image frames is to be entropy coded may comprise receiving a triggering signal. The reception of the triggering signal may comprise receiving a signal via a user interface in an image capturing device executing the method. Alternatively, or in combination, the reception of the triggering signal may comprise, receiving information that is indicating that the image capturing device executing the method is operating according to a power supply budget that currently allows entropy coding. Alternatively, or in combination, the reception of the triggering signal may comprise receiving a signal that is indicating that the image capturing device executing the method is operating under external power.

Hence, the triggering of performing the entropy coding of the stored sequence of encoded image frames may be an action taken by a user via a user interface as well as a more automatic action of, e.g., detecting that the device has been connected to external power such as a battery charger or docking station. An example of a use case involving an action taken by a user via a user interface is one where the user decides that it is necessary to perform the entropy coding even though it will result in an increased use of power.

The entropy coding of the sequence of encoded image frames into an entropy coded sequence of image frames and the storing of the entropy coded sequence of image frames may be performed by the image capturing device that captured the digital video data. Alternatively, the sequence of encoded image frames may be provided from the image capturing device to a processing system. The entropy coding of the sequence of encoded image frames into an entropy coded sequence of image frames and the storing of the entropy coded sequence of image frames may then be performed by the processing system.

Hence, having been triggered, the entropy coding and storage of the entropy coded sequence of image frames may be performed locally by the image capturing device itself, or externally in a processing system to which the image capturing device provides the stored sequence of encoded image frames. Such alternatives provides a choice to utilize the, typically very large, processing and storage power of a server or cloud based system for the entropy coding and storage of the entropy coded sequence of image frames.

The method may be initiated in that the capturing of the digital video data is initiated as a consequence of receiving an initiation signal. For example, when performed in an image capturing device, the reception of the initiation signal may comprise any of receiving a signal via an input/output interface in the image capturing device, receiving information that is indicating that the image capturing device is operating according to a power supply budget that currently disallows entropy coding, receiving a signal that is indicating that the image capturing device is operating under internal battery power, receiving a signal that is indicating a detected event in audio content recorded by the image capturing device, receiving a signal that is indicating a changed connection status of a positioning functionality of the image capturing device, and receiving a signal that is indicating a changed connection status of a data communication functionality of the image capturing device.

Hence, the method may be triggered manually by a user as well as triggered in a more automatic manner based on information such as power supply budget or real-time events detected by the image capturing device itself during operation.

In a second aspect there is provided an image capturing device comprising circuitry configured to continuously capture digital video data representing image frames. The circuitry is further configured to, while capturing the digital video data, encode the digital video data into a sequence of encoded image frames, the sequence comprising key frames and delta frames, and store the sequence of encoded image frames in a non-volatile memory of the image capturing device. The circuitry is further configured to determine that the stored sequence of encoded image frames is to be entropy coded and, as a consequence, entropy code the sequence of encoded image frames into an entropy coded sequence of image frames and store the entropy coded sequence of image frames. The storing of the entropy coded sequence of image frames may be made in the non-volatile memory of the image capturing device. Alternatively, or in combination, the storing of the entropy coded sequence of image frames may be made in a cloud based storage or on a server connected to the image capturing device.

The circuitry of the image capturing device may be configured such that the determining that the stored sequence of encoded image frames is to be entropy coded comprises receiving a triggering signal.

The circuitry of the image capturing device may be configured such that the entropy coding of the sequence of encoded image frames into an entropy coded sequence of image frames and the storing of the entropy coded sequence of image frames is performed by the image capturing device.

The circuitry of the image capturing device may be configured such that the capturing of the digital video data is initiated as a consequence of receiving an initiation signal.

The circuitry of the image capturing device may be configured such that the reception of the initiation signal comprises any of receiving a signal via an input/output circuitry in the image capturing device, receiving information that is indicating that the image capturing device is operating according to a power supply budget that currently disallows entropy coding, receiving a signal that is indicating that the image capturing device is operating under internal battery power, receiving a signal that is indicating a detected event in audio content recorded by the image capturing device, receiving a signal that is indicating a changed connection status of a positioning functionality of the image capturing device, receiving a signal that is indicating a changed connection status of a data communication functionality of the image capturing device.

The circuitry of the image capturing device may be configured such that the encoding of the digital video data into a sequence of encoded image frames is performed by an encoder operating according to any of H.264 as specified by the ITU-T, H.265 as specified by ITU-T, AVC as specified by ISO/IEC JTC 1, HEVC, as specified by the ISO/IEC JTC 1 and AV1 as specified by AOMedia.

The image capturing device may be in the form of a body worn camera (BWC). A BWC may be used by law enforcement staff and as such it is typically being worn and operated for a long period of time without being supplied by external electric power. It is therefore advantageous that the image capturing device is capable of operation as summarized above and thereby ensure that capturing of video data can be performed during a long period of time.

Such an image capturing device provides effects and advantages corresponding to those summarized above in connection with the method according to the first aspect.

Further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claims, the articles "a," "an," "the," and "said" are intended to mean that there are one or more of the elements unless the context clearly dictates otherwise. Thus, for example, reference to "a device" or "the device" may include several devices, and the like. Furthermore, the words "comprising", "including", "containing" and similar wordings does not exclude other elements or steps.

BRIEF DESCRIPTION OF THE DRAWINGS

The above and other aspects of the present disclosure will now be described in more detail, with reference to appended figures. The figures should not be considered limiting; instead, they are used for explaining and understanding. Like reference numerals refer to like elements throughout.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and to fully convey the scope of the disclosure to the skilled person.

Figure 1A:
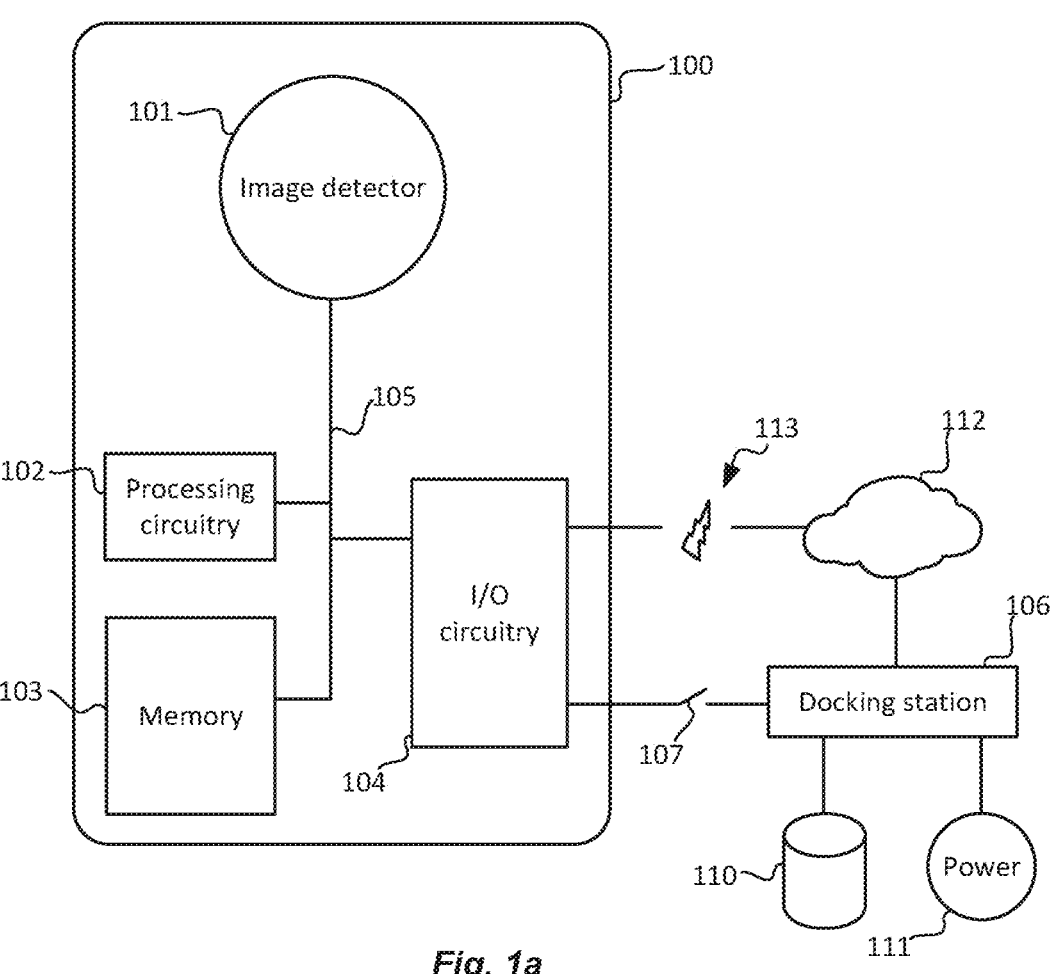
FIG. 1a schematically illustrates an image capturing device.

FIG. 1a illustrates an image capturing device 100 comprising circuitry in the form of an image detector 101, processing circuitry 102, memory 103 and input/output (I/O) circuitry 104.

The image detector 101 may comprise, in addition to necessary optical components, a detector chip and appropriately configured interface circuitry configured to provide detector data to the processing circuitry 102.

The processing circuitry 102 of the image capturing device 100 is configured to carry out overall control of functions and operations of the image capturing device 100.

The processing circuitry 102 may include a processor, such as a central processing unit (CPU), microcontroller, or microprocessor as well as an application-specific integrated circuit (ASIC) or similar circuit. The processor is configured to execute program code stored in the memory 103 in order to carry out functions and operations of the image capturing device 100.

The memory 103 may be one or more of a buffer, a flash memory, a hard drive, a removable medium, a volatile memory, a non-volatile memory, a random access memory (RAM), or another suitable device. In a typical arrangement, the memory 103 may include a non-volatile memory for long term data storage and a volatile memory that functions as system memory for the processing circuitry 102. The memory 103 may exchange data with the processing circuitry 102 over a data bus. Accompanying control lines and an address bus between the memory 103 and the processing circuitry 102 also may be present.

Functions and operations of the image capturing device 100 may be embodied in the form of executable logic routines (e.g., lines of code, software programs, etc.) that are stored on a non-transitory computer readable medium (e.g., the memory 103) of the image capturing device 100 and are executed by the processing circuitry 102 (e.g., using the processor). Furthermore, the functions and operations of the image capturing device 100 may be a stand-alone software application or form a part of a software application that carries out additional tasks related to the image capturing device 100. The described functions and operations may be considered a method that the corresponding part of the device is configured to carry out. Also, while the described functions and operations may be implemented in software, such functionality may as well be carried out via dedicated hardware or firmware, or some combination of hardware, firmware and/or software.

The image capturing device 100 is configured to continuously capture, via the image detector 101, digital video data representing image frames. While capturing the digital video data the image capturing device 100 is configured to encode the digital video data into a sequence of encoded image frames. The sequence of encoded image frames comprising key frames and delta frames. The encoding is typically performed in the processing circuitry 102. The image capturing device 100 is configured to store the sequence of encoded image frames in the memory 103. More precisely, the image capturing device 100 is configured to store the sequence of encoded image frames in a non-volatile portion of the memory 103.

The image capturing device 100 is further configured to determine that the stored sequence of encoded image frames is to be entropy coded.

The determining that the stored sequence of encoded image frames is to be entropy coded may comprises receiving a triggering signal. The triggering signal may be received as a signal via a user interface in the I/O circuitry 104 in the image capturing device 100. Alternatively, or in combination, the triggering signal may be information that is indicating that the image capturing device 100 is operating according to a power supply budget that currently allows entropy coding. Such information may, e.g., originate in the form of a predetermined setting, e.g. stored in the memory 103. Alternatively, or in combination, the triggering signal may be a signal indicating that the image capturing device 100 is operating under external power. Such a signal may be based on a detection that the image capturing device 100 is connected to a docking station 106. Such a detection may be realized by the I/O circuitry 104 detecting via a switch 107 whether or not a connection is present between the image capturing device 100 and the docking station 107, which may be provided with power from an external power source 111.

The entropy coding of the sequence of encoded image frames into an entropy coded sequence of image frames may be performed by the image capturing device 100. Alternatively, or in combination the sequence of encoded image frames may be provided from the image capturing device 100 to a processing system 110. The entropy coding of the sequence of encoded image frames into an entropy coded sequence of image frames may then be performed by the processing system 110. The entropy coded sequence of image frames may be stored locally at the image capturing device 100. The memory storing the entropy coded sequence of image frames may be the memory 103 of the image capturing device 100. Alternatively, a memory outside the image capturing device 100 may be used for storing the entropy coded sequence of image frames, such as a cloud based memory and/or a memory of a server.

The processing system 110 may be a server arrangement to which the image capturing device 100 is connected. Such connection may be realized through the I/O circuitry 104 and via, e.g., the docking station 106. Other connection path with an external processing system may be realized, as FIG. 1*a* exemplifies, through the I/O circuitry 104 comprising wireless communication capability, via a air interface 113 to a cloud based system 112. A processing system arranged in the cloud based system 112 may then be configured to perform the entropy coding of the sequence of encoded image frames into an entropy coded sequence of image frames and the storing of the entropy coded sequence of image frames.

The capturing of the digital video data may be initiated as a consequence of receiving an initiation signal. For example, the image capturing device 100 may be configured such that the reception of the initiation signal comprises any of:

Receiving a signal via the I/O circuitry 104 in the image capturing device 100. For example, the I/O circuitry 104 may comprise a user interface that includes a touch display capable of detecting and conveying a user action in the form of touching an "Initiate" button.

Receiving information that is indicating that the image capturing device 100 is operating according to a power supply budget that currently disallows entropy coding. For example, such information may, e.g., originate in the form of a predetermined setting, e.g. stored in the memory 103.

Receiving a signal that is indicating that the image capturing device 100 is operating under internal battery power. For example, the I/O circuitry 104 may be configured such that it is capable of detecting, via a switch 107, that the image capturing device 100 is disconnected from the docking station 106.

Receiving a signal that is indicating a detected event in audio content recorded by the image capturing device 100. For example, the I/O circuitry 104 may comprise a microphone that is used during the capturing of the video data for recording concurrent audio data. The processing circuitry 102 may then be configured to analyze the audio data and thereby determine that, e.g., a voice command is uttered by a user, or a specific audio noise or alarm pattern is recognized.

Receiving a signal that is indicating a changed connection status of a positioning functionality of the image capturing device 100. For example, the I/O circuitry 104 may comprise positioning circuitry, e.g. global positioning system (GPS) circuitry, that is used during the capturing of the video data for determining a location of the image capturing device 100. The processing circuitry 102 may then be configured to analyze output data of the positioning circuitry and thereby determine that, e.g., the image capturing device 100 is unable to determine its position.

Receiving a signal that is indicating a changed connection status of a data communication functionality of the image capturing device 100. For example, the I/O circuitry 104 may comprise wireless communication circuitry for communication via a mobile communication network. The processing circuitry 102 may then be configured to analyze output data of the wireless communication circuitry and thereby determine that, e.g., the image capturing device 100 is unable to communicate.

Figure 1B:
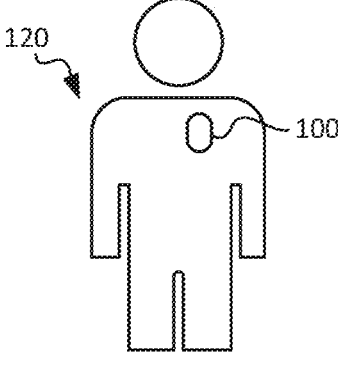
FIG. 1b schematically illustrates a body worn camera.

FIG. 1*b* illustrates an embodiment of the image capturing device 100 in the form of a a body worn camera (BWC) arranged and worn by a person 120.

Figure 2:
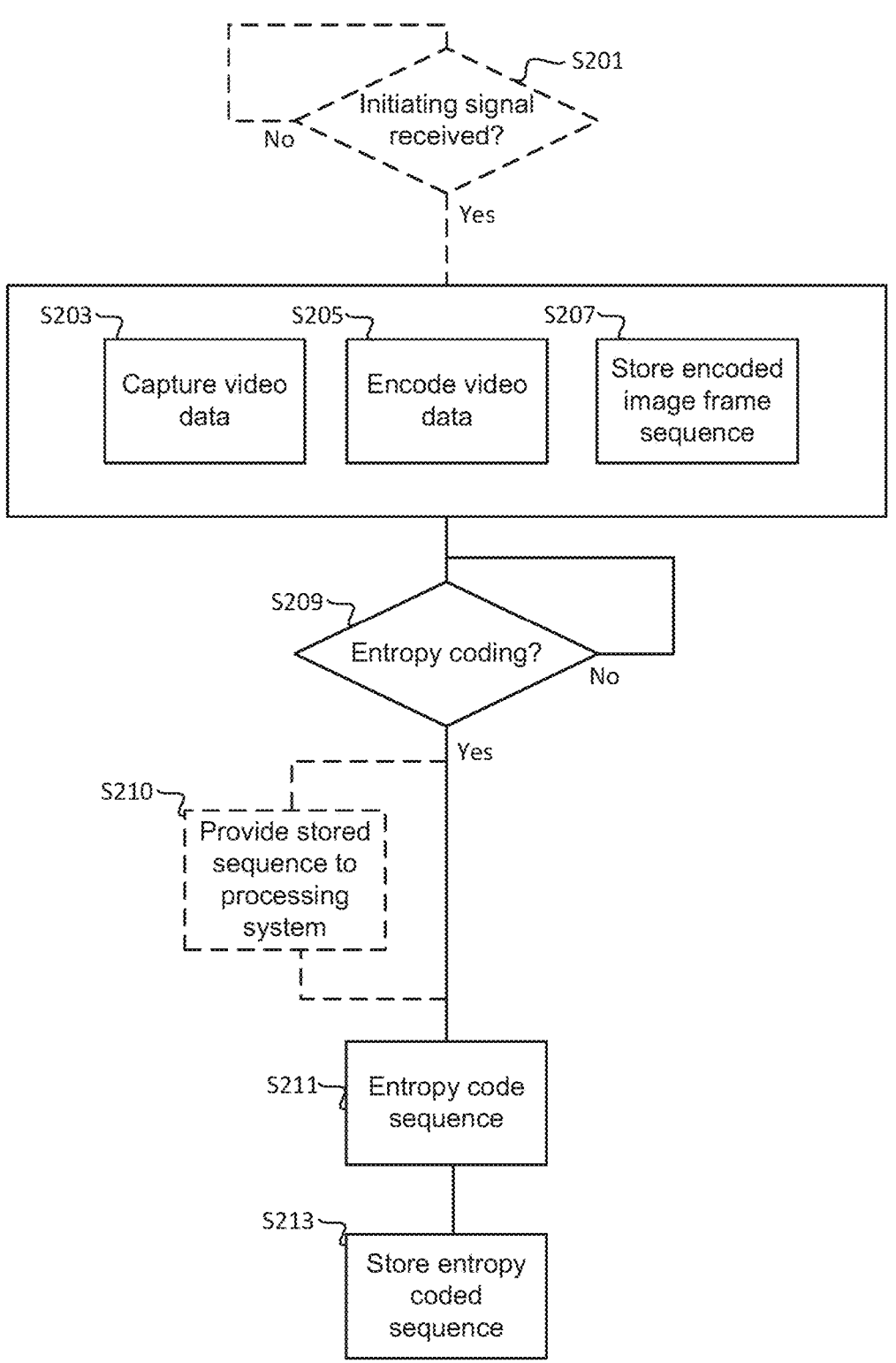
FIG. 2 is a flowchart of a method.

Turning now to FIG. 2, and with continued reference to FIGS. 1*a*-1*b*, a method of processing digital video data will be described in some detail. As mentioned above, the method may be performed by executable logic routines (e.g., lines of code, software programs, etc.) that are stored in the memory 103 of the image capturing device 100 and executed by the processing circuitry 102.

The method of processing digital video data comprises a capturing step S203 of continuously capturing digital video data representing image frames. While capturing the digital video data, the digital video data is encoded in an encoding step S205 into a sequence of encoded image frames, the sequence comprising key frames and delta frames. While the capturing step S203 continues, the sequence of encoded image frames is stored in a storage step S207. Typically, the storing of the sequence of encoded image frames is made in a non-volatile memory, preferably at the device performing the capturing of the digital video data. At a later point in time, typically in the order of minutes, hours or even days, a determination is made, in a determining step S209, that the stored sequence of encoded image frames is to be entropy coded. As a consequence, the sequence of encoded image frames is entropy coded in an entropy coding step S211 into an entropy coded sequence of image frames. The entropy coded sequence of image frames is stored in a storing step S213.

The encoding of the digital video data into a sequence of encoded image frames in the encoding step S205 may be performed by an encoder operating according to any of H.264 as specified by the International Telecommunication Union Telecommunication Standardization Sector, ITU-T, H.265 as specified by the ITU-T, Advanced Video Coding, AVC, as specified by the International Organization for Standardization and the International Electrotechnical Commission joint technical committee, ISO/IEC JTC 1, High Efficiency Video Coding, HEVC, as specified by the ISO/IEC JTC 1, and AOMedia Video 1 (AV1), as specified by the Alliance for Open Media (AOMedia).

The determination, in the determining step S209, that the stored sequence of encoded image frames is to be entropy coded may comprise receiving a triggering signal. For example, when performed in the image capturing device 100, the reception of the triggering signal may comprise any of receiving a signal via the user interface 104 in the image capturing device 100, receiving information that is indicating that the image capturing device 100 is operating according to a power supply budget that currently allows entropy coding, and receiving a signal that is indicating that the image capturing device 100 is operating under external power.

When performed in the image capturing device 100, the entropy coding of the sequence of encoded image frames into an entropy coded sequence of image frames, in the entropy coding step S211, and the storing of the entropy coded sequence of image frames, in the storing step S213, may be performed by the image capturing device 100. Alternatively, when performed in the image capturing device 100, the sequence of encoded image frames may be provided from the image capturing device 100 to the processing system 110, in a providing step S210, and the entropy coding of the sequence of encoded image frames into an entropy coded sequence of image frames, in the encoding step 211, and the storing of the entropy coded sequence of image frames in the storing step 213 may be performed by the processing system 110.

The entropy coding step S211 and the storage step S213 may in various embodiments be performed partly by the image capturing device 100 and partly by the processing system 110. In such embodiments, only part of the sequence of encoded image frames may be provided from the image capturing device 100 to the processing system 110.

Initiation of the capturing of the digital video data in the capturing step S203 may be performed as a consequence of receiving an initiation signal in a reception step S201. For example, when performed in the image capturing device 100, the reception of the initiation signal in the reception step S201 may comprise any of:

Receiving a signal via the I/O circuitry 104 in the image capturing device 100. For example, the I/O circuitry 104 may comprise a user interface that includes a touch display capable of detecting and conveying a user action in the form of touching an "Initiate" button.

Receiving information that is indicating that the image capturing device 100 is operating according to a power supply budget that currently disallows entropy coding. For example, such information may, e.g., originate in the form of a predetermined setting, e.g. stored in the memory 103.

Receiving a signal that is indicating that the image capturing device 100 is operating under internal battery power. For example, the I/O circuitry 104 may be configured such that it is capable of detecting, via the switch 107, that the image capturing device 100 is disconnected from the docking station 106.

Receiving a signal that is indicating a detected event in audio content recorded by the image capturing device 100. For example, the I/O circuitry 104 may comprise a microphone that is used during the capturing of the video data for recording concurrent audio data. The audio data may be analyzed and it may thereby be determined that, e.g., a voice command is uttered by a user, or a specific audio noise or alarm pattern is recognized.

Receiving a signal that is indicating a changed connection status of a positioning functionality of the image capturing device 100. For example, the I/O circuitry 104 may comprise positioning circuitry, e.g. global positioning system (GPS) circuitry, that is used during the capturing of the video data for determining a location of the image capturing device 100. Output data of the positioning circuitry may be analyzed and it may thereby be determined that, e.g., the image capturing device 100 is unable to determine its position.

Receiving a signal that is indicating a changed connection status of a data communication functionality of the image capturing device 100. For example, the I/O circuitry 104 may comprise wireless communication circuitry for communication via a mobile communication network. Output data of the wireless communication circuitry may be analyzed and it may thereby be determined that, e.g., the image capturing device 100 is unable to communicate.

The person skilled in the art realizes that the present disclosure by no means is limited to the preferred embodiments described above. On the contrary, many modifications and variations are possible within the scope of the appended claims.

Additionally, variations to the disclosed embodiments can be understood and effected by the skilled person in practicing the claimed disclosure, from a study of the drawings, the disclosure, and the appended claims.

The invention claimed is:

1. A method, performed in an image capturing device, of processing digital video data, the method comprising:
continuously capturing digital video data representing image frames;
while capturing the digital video data, encoding the digital video data into a sequence of encoded image frames, the sequence comprising key frames and delta frames, and storing the sequence of encoded image frames;
determining that the stored sequence of encoded image frames is to be entropy coded and, as a consequence, entropy coding the sequence of encoded image frames into an entropy coded sequence of image frames and storing the entropy coded sequence of image frames, wherein the determining that the stored sequence of encoded image frames is to be entropy coded is based on receiving a triggering signal, and wherein the reception of the triggering signal comprises receiving a signal that is indicating that the image capturing device is operating under external power.

2. The method according to claim 1, wherein the reception of the triggering signal comprises any of:
receiving a signal via a user interface in the image capturing device;
receiving information that is indicating that the image capturing device is operating according to a power supply budget that currently allows entropy coding.

3. The method according to claim 2, wherein:
the capturing of the digital video data is initiated as a consequence of receiving an initiation signal.

4. The method according to claim 1, wherein the entropy coding of the sequence of encoded image frames into an entropy coded sequence of image frames and the storing of the entropy coded sequence of image frames is performed by the image capturing device.

5. The method according to claim 4, wherein:
the capturing of the digital video data is initiated as a consequence of receiving an initiation signal.

6. The method according to claim 1, comprising providing the sequence of encoded image frames from the image capturing device to a processing system and wherein the entropy coding of the sequence of encoded image frames into an entropy coded sequence of image frames and the storing of the entropy coded sequence of image frames is performed by the processing system.

7. The method according to claim 6, wherein:
the capturing of the digital video data is initiated as a consequence of receiving an initiation signal.

8. The method according to claim 1, wherein:
the capturing of the digital video data is initiated as a consequence of receiving an initiation signal.

9. The method according to claim 8, performed in an image capturing device, wherein the reception of the initiation signal comprises any of:
receiving a signal via an input/output circuitry in the image capturing device;
receiving information that is indicating that the image capturing device is operating according to a power supply budget that currently disallows entropy coding;
receiving a signal that is indicating that the image capturing device is operating under internal battery power;
receiving a signal that is indicating a detected event in audio content recorded by the image capturing device;
receiving a signal that is indicating a changed connection status of a positioning circuitry that determines the location of the image capturing device; or
receiving a signal that is indicating a changed connection status of a wireless communication circuitry of the image capturing device.

10. The method according to claim 1, wherein the encoding of the digital video data into a sequence of encoded image frames is performed by an encoder operating according to any of:
H.264 as specified by the International Telecommunication Union Telecommunication Standardization Sector (ITU-T);
H.265 as specified by the ITU-T;
Advanced Video Coding, AVC, as specified by the International Organization for Standardization and the International Electrotechnical Commission joint technical committee (ISO/IEC JTC 1);
High Efficiency Video Coding, HEVC, as specified by the ISO/IEC JTC 1; or
AOMedia Video 1, AV1, as specified by the Alliance for Open Media (AOMedia).

11. An image capturing device comprising circuitry configured to:
continuously capture digital video data representing image frames;
while capturing the digital video data, encode the digital video data into a sequence of encoded image frames, the sequence comprising key frames and delta frames, and store the sequence of encoded image frames;
determine that the stored sequence of encoded image frames is to be entropy coded and, as a consequence, entropy code the sequence of encoded image frames into an entropy coded sequence of image frames and store the entropy coded sequence of image frames, wherein the circuitry is configured such that:
the determining that the stored sequence of encoded image frames is to be entropy coded is based on receiving a triggering signal that is indicating that the image capturing device is operating under external power.

12. The image capturing device according to claim 11, wherein the circuitry is configured such that:
the entropy coding of the sequence of encoded image frames into an entropy coded sequence of image frames and the storing of the entropy coded sequence of image frames is performed by the image capturing device.

13. The image capturing device according to claim 11, wherein the circuitry is configured such that:
the capturing of the digital video data is initiated as a consequence of receiving an initiation signal.

14. The image capturing device according to claim 13, wherein the circuitry is configured such that:

the reception of the initiation signal comprises any of:

receiving a signal via an input/output circuitry in the image capturing device;

receiving information that is indicating that the image capturing device is operating according to a power supply budget that currently disallows entropy coding;

receiving a signal that is indicating that the image capturing device is operating under internal battery power;

receiving a signal that is indicating a detected event in audio content recorded by the image capturing device;

receiving a signal that is indicating a changed connection status of a positioning circuitry that determines the location of the image capturing device;

receiving a signal that is indicating a changed connection status of a wireless communication circuitry of the image capturing device.

15. The image capturing device according to claim 11, wherein the circuitry is configured such that:

the encoding of the digital video data into a sequence of encoded image frames is performed by an encoder operating according to any of:

H.264 as specified by the International Telecommunication Union Telecommunication Standardization Sector (ITU-T);

H.265 as specified by the ITU-T;

Advanced Video Coding, AVC, as specified by the International Organization for Standardization and the International Electrotechnical Commission joint technical committee (ISO/IEC JTC 1);

High Efficiency Video Coding, HEVC, as specified by the ISO/IEC JTC 1, or AOMedia Video 1, AV1, as specified by the Alliance for Open Media (AOMedia).

16. The image capturing device according to claim 11, whereby said image capturing device comprises a body worn camera (BWC).

17. The image capturing device according to claim 12, wherein the circuitry is configured such that:

the capturing of the digital video data is initiated as a consequence of receiving an initiation signal.

18. The image capturing device according to claim 17, wherein the circuitry is configured such that:

the reception of the initiation signal comprises any of:

receiving a signal via an input/output circuitry in the image capturing device;

receiving information that is indicating that the image capturing device is operating according to a power supply budget that currently disallows entropy coding;

receiving a signal that is indicating that the image capturing device is operating under internal battery power;

receiving a signal that is indicating a detected event in audio content recorded by the image capturing device;

receiving a signal that is indicating a changed connection status of a positioning circuitry that determines the location of the image capturing device;

receiving a signal that is indicating a changed connection status of a wireless communication circuitry of the image capturing device.

\*  \*  \*  \*  \*